(No Model.) 3 Sheets—Sheet 1.
H. A. ROWLAND.
ELECTRICAL MEASURING INSTRUMENT.
No. 561,918. Patented June 9, 1896.
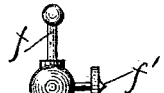
Fig. 1.
Fig. 3.
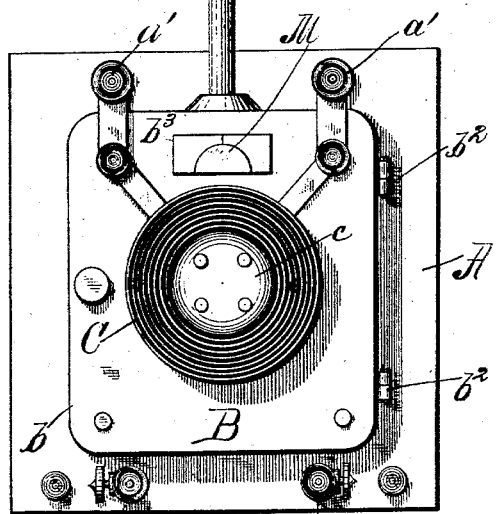
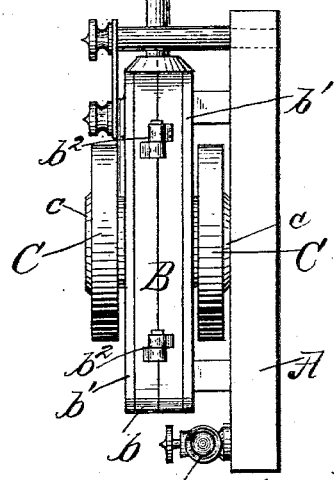
Fig. 2.
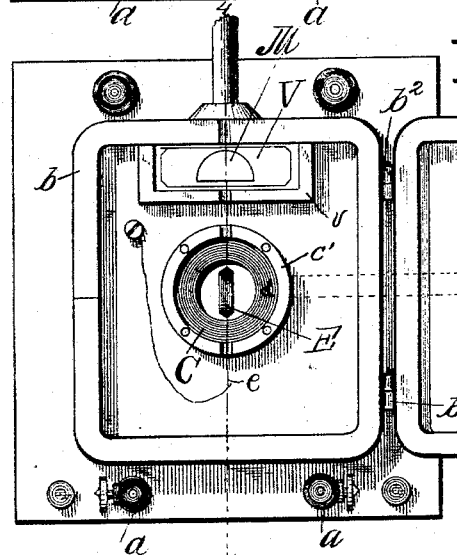
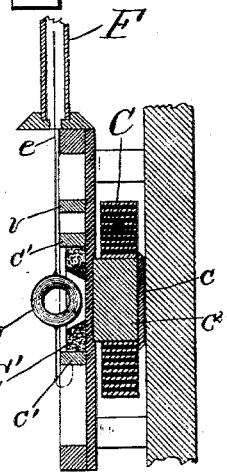
Fig. 4.
Witnesses
John H. Holt.
Percy C. Bowen.
Inventor
Henry A. Rowland
by Whitman & Wilkinson
Attorneys (No Model.) 3 Sheets—Sheet 2.
H. A. ROWLAND.
ELECTRICAL MEASURING INSTRUMENT.
No. 561,918. Patented June 9, 1896.
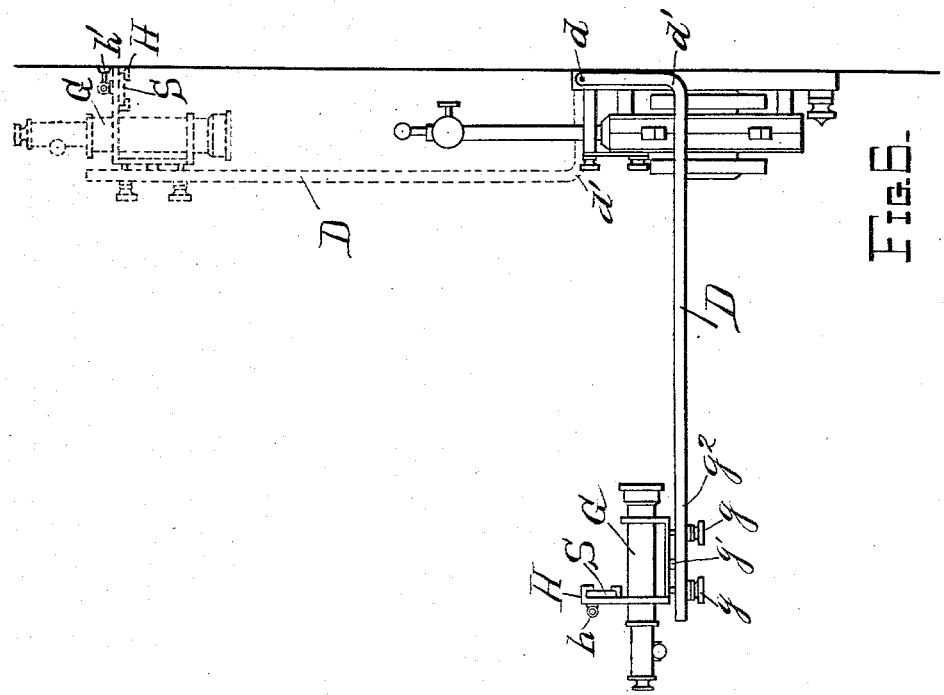
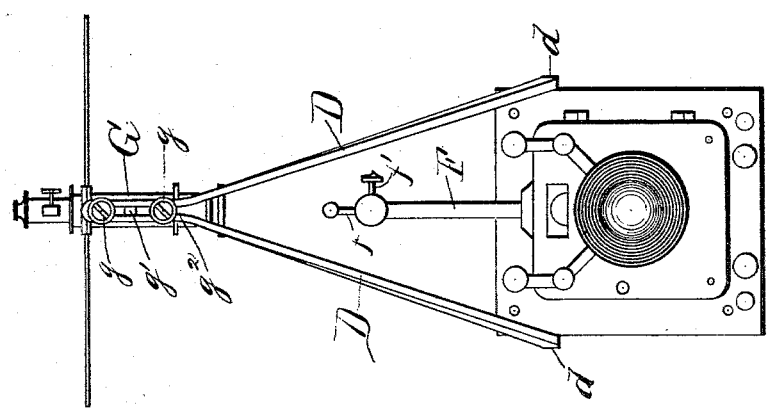

(No Model.) 3 Sheets—Sheet 3.
H. A. ROWLAND.
ELECTRICAL MEASURING INSTRUMENT.
No. 561,918. Patented June 9, 1896.
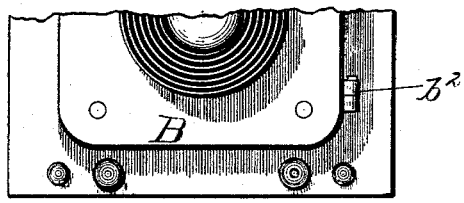
Fig. 7.
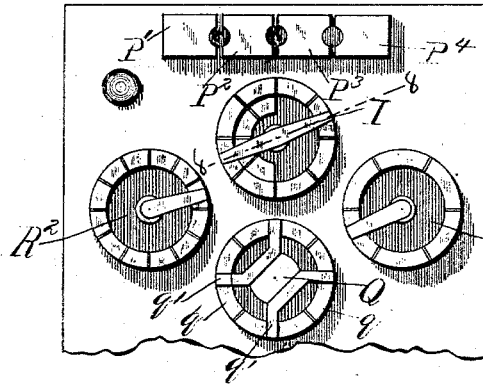
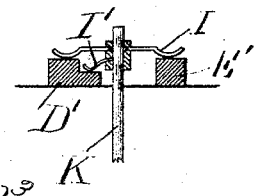
Fig. 8.
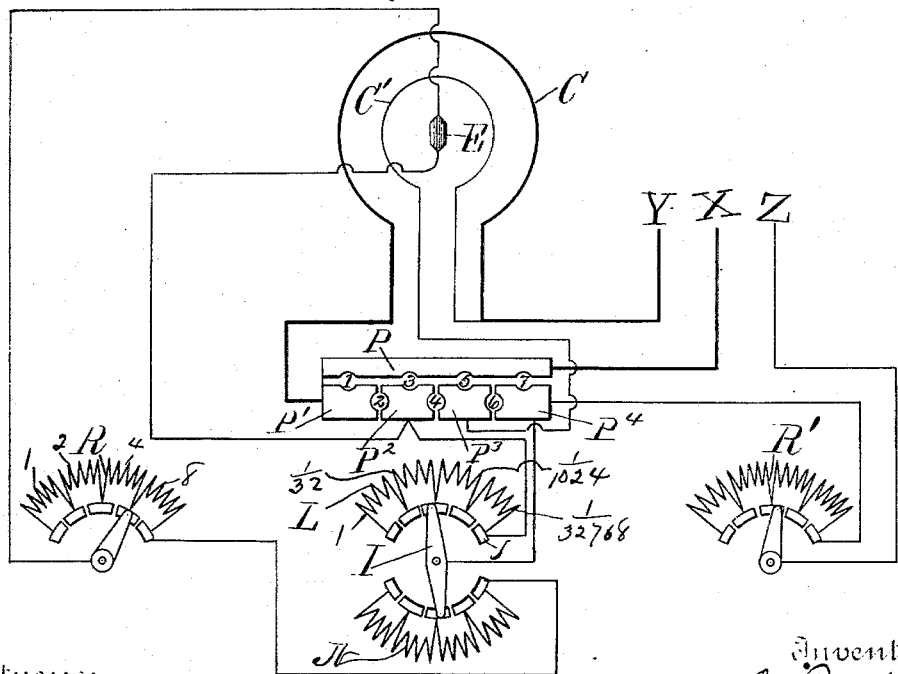
Fig. 9.
Witnesses
John H. Holt,
Percy C. Bowen.
Inventor
Henry A. Rowland,
by Whitman & Wilkinson
Attorneys.

UNITED STATES PATENT OFFICE.

HENRY AUGUSTUS ROWLAND, OF BALTIMORE, MARYLAND.

ELECTRICAL MEASURING INSTRUMENT.

SPECIFICATION forming part of Letters Patent No. 561,918, dated June 9, 1896.

Application filed October 2, 1895. Serial No. 564,438. (No model.)

*To all whom it may concern:*

Be it known that I, HENRY AUGUSTUS ROWLAND, a citizen of the United States, residing at Baltimore city, State of Maryland, have invented certain new and useful Improvements in Electrical Measuring Instruments; and I do hereby declare the following to be a full, clear, and exact description of the invention, such as will enable others skilled in the art to which it appertains to make and use the same.

My present invention relates to improvements in methods of and instruments for making various electrical measurements; and the object of this invention is to make a more convenient and accurate system of instruments for the measurement of electrical currents, both continuous and alternating, electrical, potential, self-induction, mutual induction, electrical energy, and, indeed, a very great many electrical quantities. I attain this object by the mechanism illustrated in the accompanying drawings, in which—

Figure 1 represents in front elevation my improved form of electrodynamometer; Fig. 2, the same with front open to show interior. Fig. 3 represents the dynamometer in side elevation; and Fig. 4, a section with parts broken away, taken along the line 4 4 of Fig. 2. Fig. 5 represents the dynamometer in front elevation with telescope-stand attached; and Fig. 6 represents the same with telescope down in position for reading, while in the same figure the telescope is shown in dotted lines lifted and hooked to the wall, as when not in use. Fig. 7 represents in front elevation the lower portion of the dynamometer with the shunt-box situated directly thereunder, all of which shunt-box is broken away except that portion holding the contact-makers, by means of which such amounts of resistance contained in the shunt-box may be thrown in or out of the circuit as is deemed necessary for the particular measurement. Fig. 8 is a detail view in section along the line 8 8 of Fig. 7, showing the construction of the contact-maker I. Fig. 9 is a diagram of the circuits, showing the paths of the currents, the arrangement of the resistances, and connections.

Similar letters and figures refer to similar parts throughout the several views.

Being in its most complete form a wall instrument, the dynamometer is usually provided with a base A, which can be easily screwed or otherwise attached to a wall. Upon this base A is held the dynamometer proper, B. This dynamometer is made up of the split metal frame $b$, hinged, as at $b^2$, and sustaining upon each side of the frame two vulcanite or other insulating plates $b'$, forming thereby a box in which is inclosed the suspended system, which is thus protected from drafts or other exterior damaging effects. In this instrument I use two pairs of fixed coils and one movable coil. One of the pairs of fixed coils is made of fine wire for use with small currents, while the other is of coarse wire for the measurement of currents of greater magnitude.

C represents the coils of coarse wire, which wire consists, preferably, of copper ribbon wound upon the core $c^2$ and held more securely in position by the vulcanite button $c$. The core $c^2$ is composed of any suitable insulating material. These coils C occupy similar positions on the front and back, respectively, of the instrument. Being outside, they are open to the free circulation of the air, which prevents, to a great extent, heating effects which would otherwise occur were the coils closely confined when large currents are passed through them. The coils are connected in series, the terminals being the binding-posts $a$. The other pair of fixed or stationary coils consist of fine wire, as shown at C', and are also in series.

A ring $c'$, made of fiber or other insulating material and fastened to the inside of the vulcanite faces $b'$, front and back, form cavities or receptacles in which are held the coils of wire C'. When the front of the instrument is closed, the coils C' completely inclose the movable coil E.

The movable coil E is suspended by the fine wire $e$ from the rod $f$, which rod slides within the tube F and is held in position by the screw $f'$. Just above the coil E and suspended on the same wire is the mirror M. This mirror reflects into the telescope the gradations on the scale by which the amplitude of the angle of deflection may be noted. The mirror M carries upon its back a mica vane V, the office of this vane being to facilitate damping, which is further aided in this by being inclosed in a chamber v. When the front of the instrument is closed, the mirror reflects the light through the aperture $b^3$. The dynamometer is provided with a swing-stand, upon which are held a telescope G and scale S, as shown in Figs. 5 and 6.

The arm or support D, made of any suitable material, but preferably of a light piece of iron, divides, forming two arms, each of which is pivoted to the side of the base of the instrument, as at d. The arms converging from the sides of the instrument toward the telescope become parallel at $g^2$, there forming a slot through which pass the thumb-screws g, which hold the telescope securely to the top of the frame and which arrangement allows an easy adjustment of the telescope.

While I have shown the frame carrying the telescope and scale as capable of being lifted upward and fastened to the wall above the instrument, it is clear that one arm might be hinged and the other provided with a catch, whereby the scale and telescope could be turned from right to left in a horizontal plane, or vice versa, as the case may be. This is done by making the support a combination of rigidity and friction. Thus in Fig. 1 the arm is supported by pivoting-screws, to which is added the friction of the arms grasping the base-board when it falls into position. The friction quickly dissipates the energy of vibration and brings the arm to rest. This arrangement of telescope and scale has the following advantages: The telescope and scale can be turned back on the wall and fixed by a hook whenever not needed, and can be lowered into position and perfect adjustment in a moment. Then, again, the wall is free from the vibrations of the floor, and the floor-space is free to allow a table to be placed under the instrument for taking notes or supporting other instruments. The table may be hinged to the wall, if desired.

The slotted frame H, which engages the telescope and is held rigidly thereto, holds the scale S. This scale, made of any convenient length, is graduated on the side next to the instrument and is capable of being slid either to the right or left in the slot provided for it in the frame H. Of course when there is no current flowing through the coils of the dynamometer the small mirror M will reflect the zero-mark on the scale into the telescope, and when currents do pass through the coils and the mirror is deflected to the right or left the amplitude of the angle through which the mirror is deflected is noted by the distance right or left of the zero-mark on the scale reflected into the telescope.

On the back of the frame H is attached an eyelet h, which engages a hook h' on the wall above, by which arrangement the telescope is held up against the wall when not in use.

When not used as a wall instrument, a tripod may be attached to my electrodynamometer, by which the instrument may be used upon a table or other horizontal plane.

The box which contains the resistance-coils may be either stood on the floor under the instrument or attached to the wall, as desired.

$R^2$ and $R^3$ are the contact-makers (shown on the shunt-box, Fig. 7) by which the resistances R and R', respectively, are controlled; Q, a device, consisting of the metallic quadrants q and the contact-arms q', for reversing the direction of the current when desired, and P', $P^2$, $P^3$, and $P^4$ are contact-blocks. (Shown in plan in Fig. 9.)

To greatly facilitate the use of the above-described dynamometer in the measurement of current and potential, as well as to make the instrument especially adapted to the measurement of various alternating-current quantities—such as self-induction, mutual induction, electrical energy, and other quantities, the measurement of which has always hitherto been accompanied with great complexity—I have by virtue of the present arrangement greatly simplified such measurements. I achieve this end by the arrangement shown in Fig. 9, in which I so group and arrange the resistances in the shunt-circuits as to secure a large number of shunt ratios from a comparatively small number of resistance-coils. The shunts for reducing the current in a given series of ratios consist of three series of resistances L, N, and R, Fig. 9.

P, P', $P^2$, $P^3$, and $P^4$ represent a series of metallic contact-blocks provided with plugging-holes 1, 2, 3, 4, 5, 6, and 7, by which arrangement any desired combination of connections within the scope of the instrument may be made.

As was stated above, the dynamometer as herein described is adapted to the measurement of both large and very small currents. For the former a fixed coil of coarse wire was provided and for the latter one of very fine wire; so in describing the operation of measuring currents with the instrument it is immaterial which pair of coils I use—that is, the same explanation will be sufficient for measuring both large and small currents.

For the measurement of current I assume that the current enters at X and insert plugs in 7 and 2 for large currents and 7 and 4 for small ones. The current then passes through 7 into $P^4$, from thence into the contact-maker I', (shown in detail in Fig. 8,) through suitable low resistance, then into the block $P^2$, through the plug 2, around through the large pair of fixed coils C of the dynamometer, and out at Y.

A portion of the main current is shunted through the resistance N, around through R, then into the movable coil of the dynamometer E, back into the circuit.

The practical arrangement by which the main current is allowed to pass through only low resistance, while a portion thereof is shunted through higher resistance and through the coil E, and by which arrangement, when the resistance in the main circuit is increased by a certain increment—say $r$—the shunt resistance is decreased by the same amount, is shown in Fig. 8. The main current entering at K passes up the same, then through the contact-arm I', into the block D', D' being a section through one of the segments shown at L in Fig. 9, and has interposed between it and the other blocks suitable low resistance, through which the current passes, making its exit at $l$, Fig. 9. By this means the resistance of the contact between I' and D' does not enter the shunt-valves. Now upon the rod K, Fig. 8, is another contact-arm, I, which is insulated from said rod, but which makes contact both with D' and E'. The main current entering D', a portion thereof is shunted through the arm I into the shunt resistances interposed between the contact-pieces of which E' is a section. Now it is clear that if the contact-arms I and I' are revolved as the resistance is increased in the main circuit it will accordingly be decreased in the shunt-circuit—that is, when the resistance N is increased by $r$ the resistance L is decreased by $r$—that is, if I make the set N equal the set L, which is the case, and remembering that the shunt-circuit includes the set of resistances R, the shunt value accordingly becomes $\frac{r}{R+r-r}=\frac{r}{R}$. The practical value of this idea is in the fact that if the series of resistances $r$ and R both change according to a geometrical progression the shunt values will also form a geometrical progression, which by this combination may be of immense extent. Thus if R have values 1, 2, 4, 8, 16, and $r$ the series 1, $\frac{1}{32}$, $\frac{1}{1024}$, $\frac{1}{32768}$, the inverse shunt ratios will be 1, 2, 4, 8, 16, 32, 64, 128, 256, 512, 1024, 2048, 4096, 8192, 16384, 32768, 65536, 131072, 262144, 524288. Thus out of nine resistances and four compensating coils I have obtained twenty shunt ratios. The special value of this arrangement is when heavy currents are to be measured, as in this case only the four resistances $r$ need be adapted to heavy currents, the other series $r$ and R being of fine wire. The range of shunt values is also immense.

For measuring differences of potential the posts Y and Z are used and same plugs inserted as for measuring current. In this instance the extra resistance R' is added.

For measuring watts a plug is inserted either at 1 and 2 or 4 and 5. The main current then passes through one of the pairs of coils C or C', while the potential current enters at Z, and after passing through the resistance R' is shunted through the movable coil E. By this arrangement the same shunt system is used for the measurement of all three quantities—current, potential, and watts or energy.

In the measurement of alternating currents by means of a shunt arrangement of coils the currents divide according to the impedance and not according to the resistance of the circuits. The angle of phase is also dependent on the frequency and the ratio of the resistance to the self-induction. The impedance can be put in the form $R\sqrt{1+\frac{P^2L^2}{R^2}}$, where L is the self-induction and R the true resistance. From this we see that a great simplification in electrical measurements and instruments can be made by making the ratio $\frac{R}{L}$ a constant quantity. I so proportion the circuits as to keep the ratio of the resistance to the self-induction a constant. When this is the case, all alternating currents of any frequency divide in a shunt in the same ratio as do constant currents, and I propose to utilize this fact in making alternating-current instruments. The phase-angle also is unaltered.

It will be obvious that various modifications might be made which could be used without departing from the spirit of my invention.

The various other advantages of the herein-described apparatus will be obvious to any one skilled in the art.

Having thus described my invention, what I claim, and desire to secure by Letters Patent of the United States, is—

1. The combination with a dynamometer, of a shunt-box connected to the terminals of the dynamometer, and a pivoted arm making frictional contact with the base of the instrument and carrying a reading-scale, substantially as and for the purposes described.

2. The combination with an electric measuring instrument of a shunt-box having a series of coils arranged for the main current, and two other series in the shunt-circuit, the second series being equal to the first series, and serving to keep the shunt ratios of the proper value, while the third series is in geometrical progression, the whole arrangement being such as to make the series of shunt ratios form a geometrical series of any required extent, substantially as described.

3. The combination with an electric measuring instrument of a shunt-box having a series of coils arranged for the main current, and two other series in the shunt-circuit, the second series being equal to the first series, and serving to keep the shunt ratios of the proper value, while the third series is in geometrical progression, the whole arrangement being such as to make the series of shunt ratios form a geometrical series of any required extent, and a fourth resistance-coil for measuring potential, substantially as described.

4. The combination with an electrodynamometer, of a shunt-box having a series of coils arranged for the main current, and two other series in the shunt-circuit, the second series being equal to the first series, and serving to keep the shunt ratios of the proper value, while the third series is in geometrical progression, the whole arrangement being such as to make the series of shunt ratios form a geometrical series of the desired extent, substantially as described.

5. The combination with an electrodynamometer, of a shunt-box having a series of coils arranged for the main current, and two other series in the shunt-circuit, the second series being equal to the first series, and serving to keep the shunt ratios of the proper value, while the third series is in geometrical progression, the whole arrangement being such as to make the series of shunt ratios form a geometrical series of the desired extent, and a fourth resistance-coil for measuring potential, substantially as described.

6. An electrodynamometer containing a coarse fixed coil and a fine fixed coil with means for passing the current through either coil as may be desired, and a movable coil with means for passing the shunt-current therethrough, substantially as described.

7. An electrodynamometer having its fixed coils supported by two non-conducting pieces forming when closed portions of a box to contain and protect the moving system, substantially as described.

8. An electrodynamometer in which the coils are supported by non-conducting material attached to metal frames hinged together so as to shut and form a box for the protection of the moving system, substantially as described.

9. In an electrodynamometer, the combination with a frame bearing the fixed coils and provided with a chamber, of a reflecting-mirror suspended in said chamber and a vane attached to the back of the reflecting-mirror and free to oscillate in said chamber, substantially as described.

10. In an apparatus of the character described, the combination with a pivot K and an arm I' and connections for carrying the main current, of an insulated arm I also carried by said pivot with connections for carrying the shunt-circuit through said arm, substantially as described.

11. An electrical measuring instrument, containing two fixed coils with connections for passing the electric current through either one of said coils, and one movable coil, with means for passing the shunt-current therethrough, substantially as and for the purposes described.

In testimony whereof I affix my signature in presence of two witnesses.

HENRY AUGUSTUS ROWLAND.

Witnesses:
JOHN E. BUNKER, Jr.,
HELEN M. SMITH.